(12) United States Patent
Andoh et al.

(10) Patent No.: US 10,195,672 B2
(45) Date of Patent: Feb. 5, 2019

(54) CUTTING INSERT

(71) Applicant: NGK SPARK PLUG CO., LTD., Nagoya-shi, Aichi (JP)

(72) Inventors: Naoki Andoh, Ibi-gun (JP); Minoru Koide, Tajimi (JP); Takashi Fujimoto, Komaki (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 70 days.

(21) Appl. No.: 15/505,146

(22) PCT Filed: Oct. 16, 2015

(86) PCT No.: PCT/JP2015/005241
§ 371 (c)(1),
(2) Date: Feb. 20, 2017

(87) PCT Pub. No.: WO2016/067547
PCT Pub. Date: May 6, 2016

(65) Prior Publication Data
US 2017/0266732 A1    Sep. 21, 2017

(30) Foreign Application Priority Data

Oct. 28, 2014 (JP) ................................ 2014-219067

(51) Int. Cl.
*B23B 27/22* (2006.01)
*B23B 27/04* (2006.01)
*B23B 27/14* (2006.01)

(52) U.S. Cl.
CPC .............. *B23B 27/04* (2013.01); *B23B 27/14* (2013.01); *B23B 27/22* (2013.01)

(58) Field of Classification Search
CPC ....... B23B 27/045; B23B 27/22; B23B 27/04; B23B 27/16
See application file for complete search history.

(56) References Cited

U.S. PATENT DOCUMENTS 5,360,298 A * 11/1994 Hedlund ............... B23B 27/045
407/110
5,411,354 A * 5/1995 Gustafsson ........... B23B 27/045
407/104
(Continued)

FOREIGN PATENT DOCUMENTS

JP     2008-272924 A    11/2008
JP     2010-99815 A      5/2010
(Continued)

OTHER PUBLICATIONS

Japan Patent Office, International Search Report issued in corresponding Application No. PCT/JP2015/005241, dated Nov. 17, 2015.
(Continued)

*Primary Examiner* — Nicole N Ramos
(74) *Attorney, Agent, or Firm* — Stites & Harbison, PLLC; Jeffrey A. Haeberlin; James R. Hayne (57) ABSTRACT

Inclined surfaces are formed on a rake face and a recessed groove is formed in the central portion between the inclined surfaces. A groove width of the recessed groove gradually increases from the position of the end cutting edge toward the rear, then gradually decreases such that the recessed groove has a narrowest portion at a position P2 forward of the position P3 of an upper end of a breaker wall and rearward of a positive rake angle rear end position P1, and then gradually increases toward the rear up to the position P3 of the upper end of the breaker wall. The dimensional relation W1<W2<W3 holds, where W1 is the groove width at the end cutting edge, W2 is the groove width at the narrowest portion, and W3 is the groove width at the position P3 of the upper end of the breaker wall.

5 Claims, 6 Drawing Sheets

(56) References Cited

U.S. PATENT DOCUMENTS

| | | | |
|---|---|---|---|
| 7,883,300 B1* | 2/2011 | Simpson, III | B23B 27/045 407/113 |
| 2008/0240874 A1 | 10/2008 | Nagaya | |
| 2008/0240875 A1* | 10/2008 | Nagaya | B23B 27/045 407/113 |
| 2012/0099935 A1* | 4/2012 | Hecht | B23B 27/1614 407/100 |
| 2014/0147219 A1* | 5/2014 | Kaufmann | B23B 27/045 407/11 |
| 2014/0348601 A1* | 11/2014 | Hecht | B23B 27/1622 407/104 |

FOREIGN PATENT DOCUMENTS

| | | |
|---|---|---|
| JP | 2010-99816 A | 5/2010 |
| JP | 2011-98427 A | 5/2011 |
| WO | 2011-093333 A1 | 8/2011 |
| WO | 2011-149091 A1 | 12/2011 |
| WO | 2012-043629 A1 | 4/2012 |

OTHER PUBLICATIONS

Japan Patent Office, Written Opinion of the International Search Authority, issued in corresponding Application No. PCT/JP2015/005241, dated Nov. 17, 2015.

* cited by examiner

CUTTING INSERT

CROSS REFERENCE TO RELATED APPLICATIONS

This international patent application claims priority from Japanese Patent Application No. 2014-219067 filed with the Japanese Patent Office on Oct. 28, 2014, and the entire contents of Japanese Patent Application No. 2014-219067 are incorporated by reference in this international application.

TECHNICAL FIELD

The present invention relates to a cutting insert (a cutting edge tip of, for example, the throw-away type) for turning workpieces (metallic works such as round bars and shaft members) and suitable for grooving and cutting-off.

BACKGROUND ART

The cutting insert used for such machining operations generally includes an end cutting edge and side cutting edges as viewed from a rake face side. The end cutting edge is straight, and the side cutting edges extend rearward from opposite ends of the end cutting edge. When turning is used for grooving and cutting-off a workpiece, the workpiece is fixed to a main spindle (chuck) of a lathe, and a cutting tool (turning tool) with a cutting insert suitable for the intended machining operation fixed to an end of a holder is attached to a tool post. Then the tool post is moved (longitudinally fed) toward the rotating workpiece at an appropriate feed rate (mm/rev) in the radial direction of the workpiece (a direction perpendicular to the rotation axis).

Chips discharged during grooving and cutting-off flow (are discharged) basically rearward (in a direction away from the rotation axis) because the end cutting edge is generally parallel to or nearly parallel to the rotation axis of the workpiece. If, during machining, a long chip flows rearward or a chip forms a coil shape, the chip may swing laterally and cause scratches on the workpiece, or the chip wraps around the cutting edge or the workpiece. To prevent these problems, a wall (breaker wall) rising obliquely rearward from the rake face is generally provided in a cutting insert of the above type so that chips flowing rearward curl into a flat spiral spring shape. This rake face shape is designed such that chips curl into a flat spiral spring shape. Chips formed during grooving and cutting-off are deformed by shearing resistance and heat, and therefore the discharged chips have a thickness larger than the cutting depth and also have a stripe shape with a width larger than the width of the end cutting edge. In this case, the opposite ends (edges) of the chips rub against the wall surfaces of the machined groove (the groove wall surfaces) or the end surfaces of the cut-off workpieces (the cut end surfaces. These cut end surfaces and the groove wall surfaces are collectively referred to as cut end surfaces), so that the cut end surfaces are scratched and deterioration in surface accuracy (the roughness of the machined surface) occurs. As described above, also during grooving and cutting-off as well as during other turning operations, so-called chip disposability, i.e., how to smoothly dispose of discharged chips while preventing the chips from coming into contact with the workpiece, is important.

In view of the above, various cutting inserts in which the shapes of the end cutting edge and the rake face, etc. are improved have been proposed in order to improve the chip disposability (Patent Documents 1 and 2). Specifically, for example, a recessed groove (a dent) extending in a forward-rearward direction is formed in a central portion of the rake face that includes the end cutting edge and is interposed between the opposite side cutting edges. When this cutting insert with the recessed groove formed therein is used for cutting, the chip is bent such that the widthwise central portion of the chip in its transverse cross section is bent so as to conform to the recessed groove. When the chip flows rearward, portions of the chip close to its opposite lateral edges are lifted by the opposite groove edges (ridge portions) of the recessed groove, and the chip is thereby deformed so as to curl in its width direction, so that the width of the chip is reduced. In this manner, the occurrence of scratches caused by chips rubbing against the cut end surfaces is reduced. Since the wall rising obliquely rearward is provided on the rake face, the chip flowing along the wall surface curls into a flat spiral spring shape and is cut into an appropriate curl length.

PRIOR ART DOCUMENTS

Patent Documents

Patent Document 1: Japanese Patent Application Laid-Open (kokai) No. 2011-98427
Patent Document 2: Japanese Patent Application Laid-Open (kokai) No. 2010-99816

SUMMARY OF THE INVENTION

Problems to be Solved by the Invention

When the cutting inserts described in Patent Documents 1 and 2 are used for grooving or cutting-off, the width itself of chips is reduced. However, when the workpiece is formed of a high-strength and tough material such as stainless steel or carbon steel and is machined under the machining condition of a small feed rate (mm/rev), thin and long coil-shaped chips are formed and flow while swinging laterally. This causes a problem in that the chips are likely to rub against the cut end surfaces or to wrap around the workpiece. Specifically, when such a cutting insert is used to perform test cutting on, for example, a round bar-shaped workpiece formed of SUS304 and having a diameter of 8 mm under the machining conditions of a cutting speed of 80 m/min and a small feed rate of 0.02 to 0.03 mm/rev, long chips are formed and flow while swinging laterally, so that the chips do not curl into a flat spiral spring shape but are formed into an elongated coil shape. In this case, when only the feed rate, which is one of the machining conditions, is changed to a large value, i.e., 0.05 to 0.08 mm/rev, the formation of the elongated coil shape is reduced to some extent, but the chips tend to be discharged as conically wound chips or laterally displaced flat spiral spring-shaped chips, so that the desired chip disposability is not obtained. When the feed rate is increased to about 0.1 mm/rev, the chips are discharged as flat spiral spring-shaped chips with no lateral displacement, and the occurrence of scratches on the cut end surfaces and the occurrence of wrapping are improved considerably. In the present invention, the flat spiral spring-shaped chips with no lateral displacement mean curled chips in the form of flat spiral spring that do not form problematic scratches on the cut end surfaces because the chips have substantially no lateral displacement.

As can be seen from the results of the test cutting, when grooving or cutting-off is performed through use of the above-described conventional cutting inserts under low-feed-rate machining conditions, there arises a problem in that chips can flow laterally and come into contact with the cut end surfaces etc. Another problem is that, since the workpiece is thin, the chips having an elongated coil shape may easily wrap around the workpiece. When the chips wrap around the workpiece, its outer circumferential surface may be scratched, and the machine used is forced to stop in some cases, so that the efficiency of machining may be reduced. When the chips do not form an elongated coil shape, the wrapping problem is small. However, when the chips are discharged as conically wound chips or laterally displaced flat spiral spring-shaped chips, the problem of deterioration in surface roughness caused by contact between the chips and the cut end surfaces is still present. As described above, particularly when the feed rate during machining such as grooving using the conventional cutting inserts is small and therefore the chips are thin, problems with chip disposability remain unsolved.

In view of the foregoing circumstances, the present inventors have paid attention to what the principal cause of the above problems is and conducted extensive studies to solve the problems. As described above, cutting chips are bent in their width direction in a recess (dent) provided in the end cutting edge such that the central portions of the chips conform to the recess, and the resulting chips flow rearward. This process allows the chips to be reduced in width. However, the inventors thought that the above problems occur because the guiding action of the recessed groove when the chips flow rearward is insufficient. The inventors have produced prototype cutting inserts having different rake face shapes and different recessed groove structures and repeated test cutting. The inventors have found a rake face shape etc. that allow discharged chips to be reduced in width, to be guided rearward with no lateral wobbling by the improved guiding action of the rake face, and to be curled into a flat spiral spring shape with no lateral displacement and be stably discharged, irrespective of the thickness of the chips that varies according to the amount of feed.

The present invention has been made based on the above findings, and it is an object to provide a cutting insert having a rake face shape that is excellent in chip disposability and that allows chips to be reduced in width, to flow rearward with no lateral wobbling while guided by the improved guiding action of the rake face, and to be curled into a flat spiral spring shape with no lateral displacement and be stably discharged, irrespective of the thickness of the chips.

Means for Solving the Problems

The invention described in claim 1 is a cutting insert having an end cutting edge and side cutting edges extending rearward from opposite ends of the end cutting edge, wherein a rake face of the cutting insert includes a positive rake face inclined downward from the end cutting edge toward the rear of the cutting insert so that a positive rake angle is obtained and further includes a breaker wall rising obliquely from a rear end of the positive rake face or from a position rearward of the rear end, wherein, in a portion of the rake face, the portion extending from the end cutting edge along the side cutting edges in a forward-rearward direction, inclined surfaces are formed such that the inclined surfaces incline downward from the side cutting edges toward a central portion of the rake face between the side cutting edges, and a recessed groove located downward of the inclined surfaces is formed in the central portion between the inclined surfaces such that the recessed groove extends rearward from the end cutting edge in the forward-rearward direction beyond the upper end of the breaker wall into a portion rearward of the breaker wall, wherein the recessed groove is formed such that, in a forward-rearward region between the end cutting edge and the upper end of the breaker wall, a groove width of the recessed groove as viewed from a rake face side gradually increases from the position of the end cutting edge toward the rear, then gradually decreases such that the recessed groove has a narrowest portion at a position forward of the position of the upper end of the breaker wall and rearward of a positive rake angle rear end position which is the rear end of the positive rake face, and then gradually increases from the position of the narrowest portion toward the rear until the position of the upper end of the breaker wall, and wherein the recessed groove is formed such that, when the groove width at the position of the end cutting edge is denoted by W1, the groove width at the position of the narrowest portion is denoted by W2, and the groove width at the position of the upper end of the breaker wall is denoted by W3, then the groove widths W1, W2, and W3 satisfy a dimensional relation W1<W2<W3.

The invention described in claim 2 is a cutting insert according to claim 1, wherein each of the inclined surfaces includes a first inclined surface inclined downward at a relative small angle α1 from a corresponding one of the side cutting edges toward the central portion between the side cutting edges; and a second inclined surface continuous with the first inclined surface and inclined downward at an angle α2 larger than the small angle α1.

The invention described in claim 3 is a cutting insert according to any one of claims 1 and 2, wherein W1 and Wa satisfy a dimensional relation W1≤Wa/2, where Wa is the length of the end cutting edge when the end cutting edge is viewed from the rake face side.

The invention described in claim 4 is a cutting insert according to any one of claims 1 to 3, wherein corners formed by the end cutting edge and the side cutting edges are rounded as viewed from the rake face side.

The invention described in claim 5 is a cutting insert according to any one of claims 1 to 4, wherein the cutting insert is a cutting insert for grooving or cutting-off.

Effects of the Invention

In the cutting insert according to the present invention configured as described above, the rake face includes the breaker wall rising obliquely rearward etc. This allows stripe-shaped chips generated during grooving or cutting-off to flow rearward along the rake face so as to curl (coil) into a flat spiral spring shape. In the rake face configured as described above, the inclined surfaces inclined downward from the lateral side cutting edges toward the central portion are formed so as to extend along the opposite sides of the rake face. The recessed groove extending rearward from the end cutting edge is provided in the central portion, with respect to the direction of the width of the recessed groove (the lateral distance between the side cutting edges), of the rake face such that, in the forward-rearward region, the groove width changes so as to satisfy the above-described groove width relations. In this configuration, chips generated when the cutting insert according to the present invention is used to perform grooving or cutting-off have a transverse cross-sectional shape corresponding to the shape of the end cutting edge including the opposite inclined surfaces and the recessed groove interposed therebetween, i.e., have a downward convex shape (convex toward the rake face). Then the formed chips are guided along the recessed groove having a widthwise dimension varying as described above and flow rearward while pressed against the rake face. Therefore, irrespective of the thickness of the chips that varies according to the amount of feed, the chips curl into a flat spiral spring shape with no lateral displacement and are then discharged. In this manner, the workpiece is prevented from being scratched, and improvement in the surface roughness of the cut end surfaces is achieved. The present invention demonstrates that the above effects are obtained in actual machining. When chips are generated, after the chips are deformed by the recessed groove shape of the end cutting edge, etc. to have a downward convex shape (a shape convex toward the rake face), the chips flow through the recessed groove whereby the above-described effects are obtained. The present inventors think that the following mechanism (the flow of the chips, etc.) yields the above-described effects. In the present invention, the positive rake face inclined downward from the end cutting edge toward the rear, the breaker wall rising obliquely from the rear end of the positive rake face or from a portion rearward of the rear end, and a portion connecting the positive rake face to the breaker wall may be straight lines, concave curves, or combinations thereof, as viewed from the side cutting edge side. Therefore, these portions may be flat surfaces, inclined flat surfaces, curved surfaces, or combinations thereof.

During machining using the cutting insert according to the present invention, cutting chips generated by the end cutting edge have a transverse cross section corresponding to the opposite inclined surfaces and the recessed groove, which form the shape of the end cutting edge. The recessed groove has the groove width W1 and interposed between the opposite inclined surfaces. Specifically, a central portion of each chip in the widthwise direction has a downward convex shape. When such a chip generated as described above starts flowing rearward along the recessed groove, the chip flows rearward while being pressed toward the bottom of the recessed groove so as to sag toward the bottom because the groove width of the recessed groove gradually increases toward the rear. The chip flowing rearward has a downward convex ridge (core) continuously extending in a forward-rearward direction. The convex ridge, along with the sagging of the chip into the recessed groove, allows the chip to stably flow rearward in the recessed groove. In addition, the chip sagging into the recessed groove undergoes a deformation action because the chip is pressed toward the bottom of the recessed groove, so that the chip is reduced in width accordingly.

As described above, the chip sagging into the recessed groove flows rearward and is reduced in width. When the resulting chip flows through the portion of the recessed groove in which the groove width gradually decreases, the opposite sides of the chip or its portions near the opposite sides are pressed against the opposite edges of the recessed groove (corners (ridges) formed by the inclined surfaces and the opposite groove wall surfaces of the recessed groove). The chip thereby undergoes the deformation action such that, in the transverse cross section of the chip, the portions of the chip near its opposite ends are lifted up (the chip is folded). Specifically, when the chip undergoes the deformation action described above, the chip is deformed so as to have a transverse cross section with its widthwise central portion being more convexed downward and is further reduced in width. The chip undergoing the deformation action described above flows through the potion in which the groove width of the recessed groove gradually decreases and then reaches the narrowest portion (hereinafter may be referred to also as a waist portion) at which the recessed groove has the groove width W2. At this position, the deformation action in the width direction due to the folding action becomes maximum.

In addition, the narrowest portion (waist portion) having the groove width W2 is located rearward of the rear end of the positive rake face, which is the position of the rear end of the region where a positive rake angle is provided (hereinafter, referred to also as the positive rake angle rear end position). Specifically, the narrowest portion is located rearward of a position at which the inclination of the rake face changes from positive to negative (the forward end position at which the rake angle becomes negative (0°) or the position of the base point of the rising breaker wall). Therefore, the opposite sides (or portions near the opposite sides) of the chip passing through the narrowest portion receive very strong pressing forces from the opposite edges (ridges) of the recessed groove. However, since the groove width W2 is set to be larger than the groove width W1 at the end cutting edge, the downward convex portion (and the continuous convex ridge) of the chip generated at the start of the cutting is not disengaged from the recessed groove also in the narrowest portion (waist portion), and therefore the guiding action on the rearward flow is not lost.

The chip having passed through the narrowest portion having the groove width W2 then flows rearward in the portion of the recessed groove in which the groove width gradually increases toward the upper end of the breaker wall rearward of the narrowest portion. In this flow, the chip again flows rearward while being pressed toward the bottom of the recessed groove so as to sag toward the bottom. Therefore, the chip is guided along the recessed groove and can flow to the upper end of the breaker wall with no lateral movement. The chip flowing rearward along the rake face in the manner described above thereby curls into a flat spiral spring shape with no lateral displacement and is cut to an appropriate length. The flow of the chip is not influenced by its thickness. Therefore, even when the feed rate is small and the thickness of the chip is small, the chip is disposed of as a chip curled into a flat spiral spring shape with no lateral displacement.

With the cutting insert of the present invention, chips generated during grooving or cutting-off and then discharged are reduced in width and curled into a flat spiral spring shape with no lateral displacement. Therefore, the groove wall surfaces or cut end surface of the workpiece are prevented from being scratched by the chips, and the chips are prevented from wrapping around the workpiece. In the present invention, the above effects are obtained irrespective of the thickness of the chips. As the thickness of the chips decreases, the chips are more likely to deform in the widthwise direction into a downward convex shape and to sag deeply into the recessed groove after the deformation. Therefore, these effects are remarkable when a tough and high-strength material such as stainless steel or carbon steel is machined under the machining condition of a small feed rate which results in formation of thin chips.

The groove width of the recessed groove in the present invention will be described. In a forward-rearward region between the end cutting edge (the forward end) at which the recessed groove has the groove width W1 and the narrowest portion at which the recessed groove has the groove width W2, the groove width gradually increases from the position of the end cutting edge at the forward end toward the rear and then gradually decreases. Therefore, when the maximum groove width in an intermediate portion of the forward-rearward region (the forward-rearward region between the position at which the recessed groove has the groove width W1 and the position at which the recessed groove has the groove width W2 (the narrowest waist portion)) is denoted by Wm, it is preferable that the groove width Wm is larger than the groove widths W1 and W2 and less than W3. Specifically, it is preferable that the dimensional relation W1<W2<Wm<W3 holds. Preferably, when the cutting edge of the cutting insert of the present invention is viewed from the rake face side, the end cutting edge is laterally symmetric (or substantially laterally symmetric) with respect to a straight line drawn rearward from the center of the end cutting edge so as to be perpendicular to the end cutting edge. Preferably, when the rake face is viewed from the front flank face side, the shape of the rake face in a cross section perpendicular to the above straight line is laterally symmetric (or substantially laterally symmetric) with respect to a straight line drawn from the center of the end cutting edge so as to be perpendicular to the end cutting edge. The transverse cross section of the recessed groove may have an arc shape (the shape of an arc corresponding to a semicircle or a portion thereof), a V shape, or a square shape (a rectangular shape). Preferably, the groove depth from the side cutting edges (the maximum depth at the center of the groove when the transverse cross section of the recessed groove has an arc shape or a V shape) gradually increases from the position of the end cutting edge at the forward end toward the rear, becomes maximum (deepest) at the intermediate portion in the forward-rearward region between the position at which the recessed groove has the groove width W1 and the position at which the recessed groove has the groove width W2, then gradually decreases, becomes minimum at or near the narrowest portion, and then gradually increases toward the rear at least until a position corresponding to the upper end of the breaker wall.

The contribution of the inclined surfaces to the ability to lift or bend at portions of a chip near its opposite ends in its transverse cross section increases as the inclination angles of the inclined surfaces increase. However, large inclination angles are likely to cause chipping due to a reduction in strength of the side cutting edges, particularly their portions near the forward end. Therefore, the angles of inclination from the side cutting edges toward the central portion are set to appropriate small angles (e.g., 1° to 15°), in consideration of the above fact. However, it is unnecessary that each inclined surface (one of the inclined surfaces) is a single inclined surface, and each inclined surface may be formed from a plurality of inclined surfaces (may have a plurality of stages). In this case, as in the invention according to claim 2, each inclined surface may include two inclined surfaces (two inclined stages) including a first inclined surface and a second inclined surface continuous therewith. This can contribute to the solution to the foregoing problems without complication of the structure. These inclined surfaces may be formed as curved surfaces.

As for the dimensional relation between the groove width W1 at the end cutting edge and the length (dimension) Wa of the end cutting edge when the end cutting edge is viewed from the rake face side, the groove width W1 is preferably equal to or less than ½ of Wa, as in the invention according to claim 3. Preferably, from the viewpoint of prevention of chipping, the corners formed by the end cutting edge and the side cutting edges are rounded, as in the invention according to claim 4. The roundness of each corner may be appropriately set according to the length of the end cutting edge etc. and the machining conditions. The cutting insert according to the present invention is widely applicable to cutting inserts for grooving and cutting-off and can be embodied irrespective of the number of cutting edges, the shape of the main body of the cutting insert, i.e., the shape (structure) of portions other than the cutting edge, and the method for fixing the cutting insert to a holder. Preferably, ridge lines (ridge portions) between the inclined surfaces and the groove wall surfaces of the recessed groove are formed such that the distances therebetween gradually increase or gradually decrease, whereby the ridge lines form continuous curves, as viewed in plan (from the rake face side).

MODES FOR CARRYING OUT THE INVENTION

An exemplary embodiment embodying the cutting insert of the present invention will be described in detail with reference to FIGS. 1 to 6. A cutting insert 100 in the present example is used for forming a groove with a prescribed width, cutting-off (cutting off) a prescribed small-diameter round bar, etc. The cutting insert 100 has a substantially parallelogrammic plate-like general shape and includes cutting edges 10 at two opposite acute corners with a clamping screw hole 105 therebetween. The screw hole 105 is formed at the center of the plate-shaped portion of the insert. Each of the cutting edges 10 is formed by shaving one side of the parallelogram (plate) such that a substantially triangular portion including an acute corner is reduced in thickness (see, for example, FIG. 1A). Specifically, the triangular thin plate portions 22 form the cutting edges 10 for grooving and cutting-off. The cutting edges 10 will next be mainly described. In the present example, the two cutting edges 10 have the same size and the same shape, and therefore one of them will be described. The material of the cutting insert of the present invention is "cemented carbide" and is specifically "coated cemented carbide." However, the material is not limited to the above materials. Other usable materials are known materials such as "cermet" and "ceramics."

The cutting insert 100 in the present example is disposed such that, of a surface 30 of the parallelogrammic plate extending along a long side thereof, a portion near an acute corner forms a rake face 40. The details of the shape, structure, etc. of the rake face 40 will be described later. Of a surface 32 of the parallelogrammic plate extending along a short side thereof, a portion near the acute corner is cut by a plane such that a front flank face 33 with an appropriate front clearance angle is formed. In the cutting insert 100 in the present example, a ridgeline portion at which the forward end of the rake face 40 (its portion near the acute corner) crosses the front flank face 33 forms an end cutting edge 110.

Figure 1:
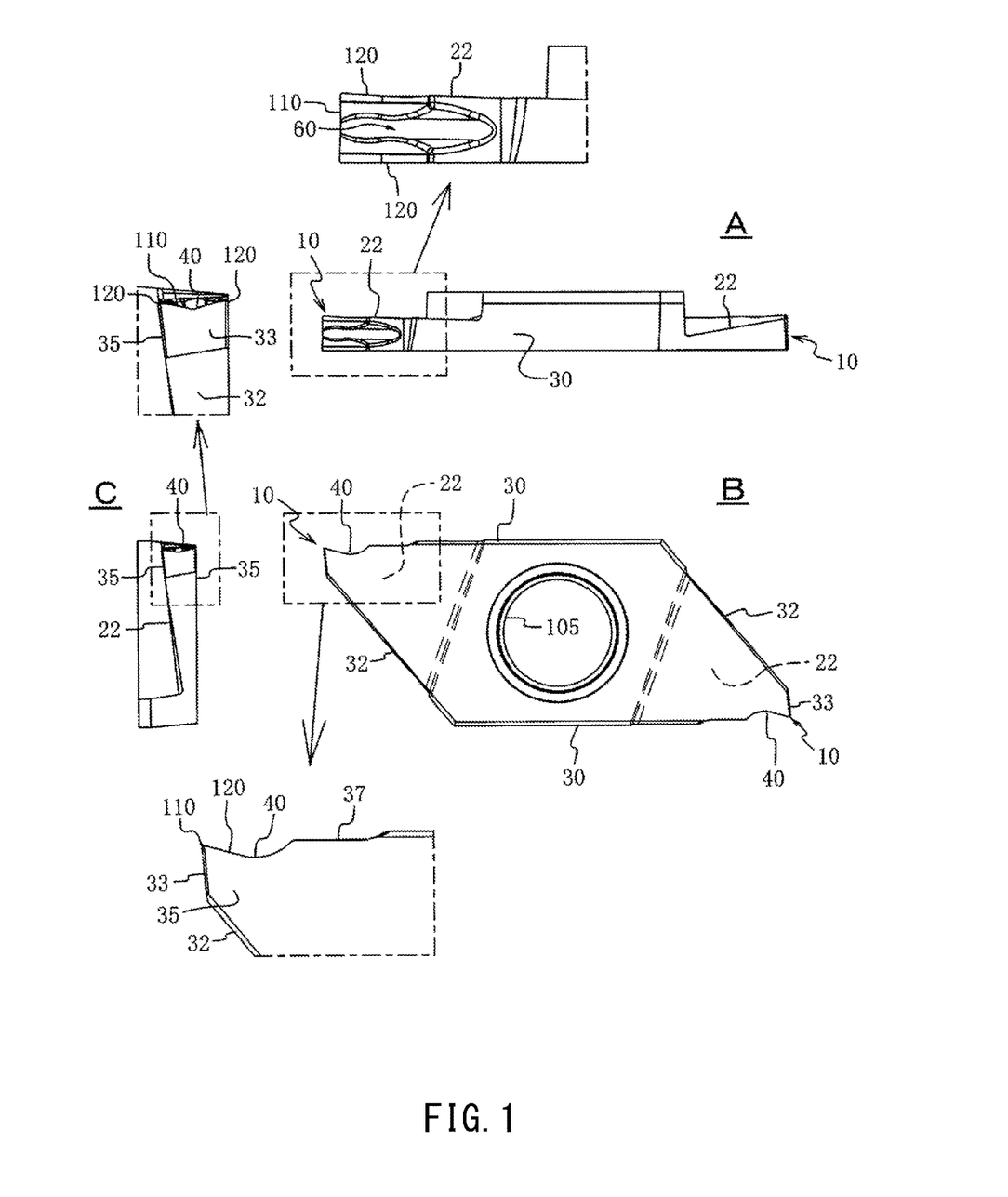
FIG. 1 shows illustrations of an exemplary embodiment embodying the cutting insert of the present invention, FIG. 1A being a view of the cutting insert as viewed from the rake face side of a cutting edge, FIG. 1B being a view of the cutting insert as viewed from a side flank face side, FIG. 1C being a view of the cutting insert as viewed from a front flank face side, FIGS. 1A, 1B, and 1C also showing enlarged views of essential parts of these illustrations.
Figure 2:
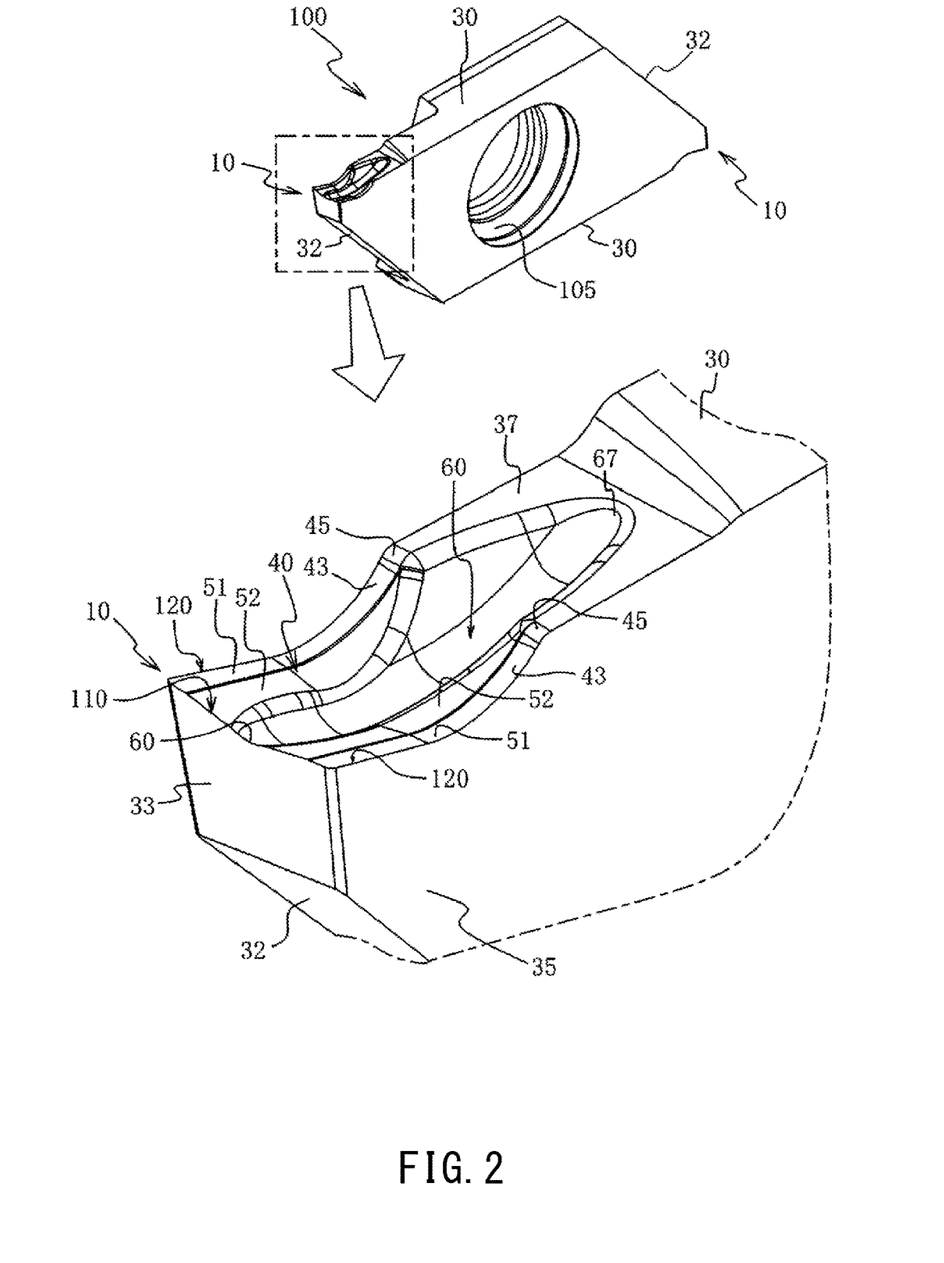
FIG. 2 shows a perspective view of the rake face as viewed from the front flank face side and an enlarged view of an essential part of the perspective view.
Figure 3:
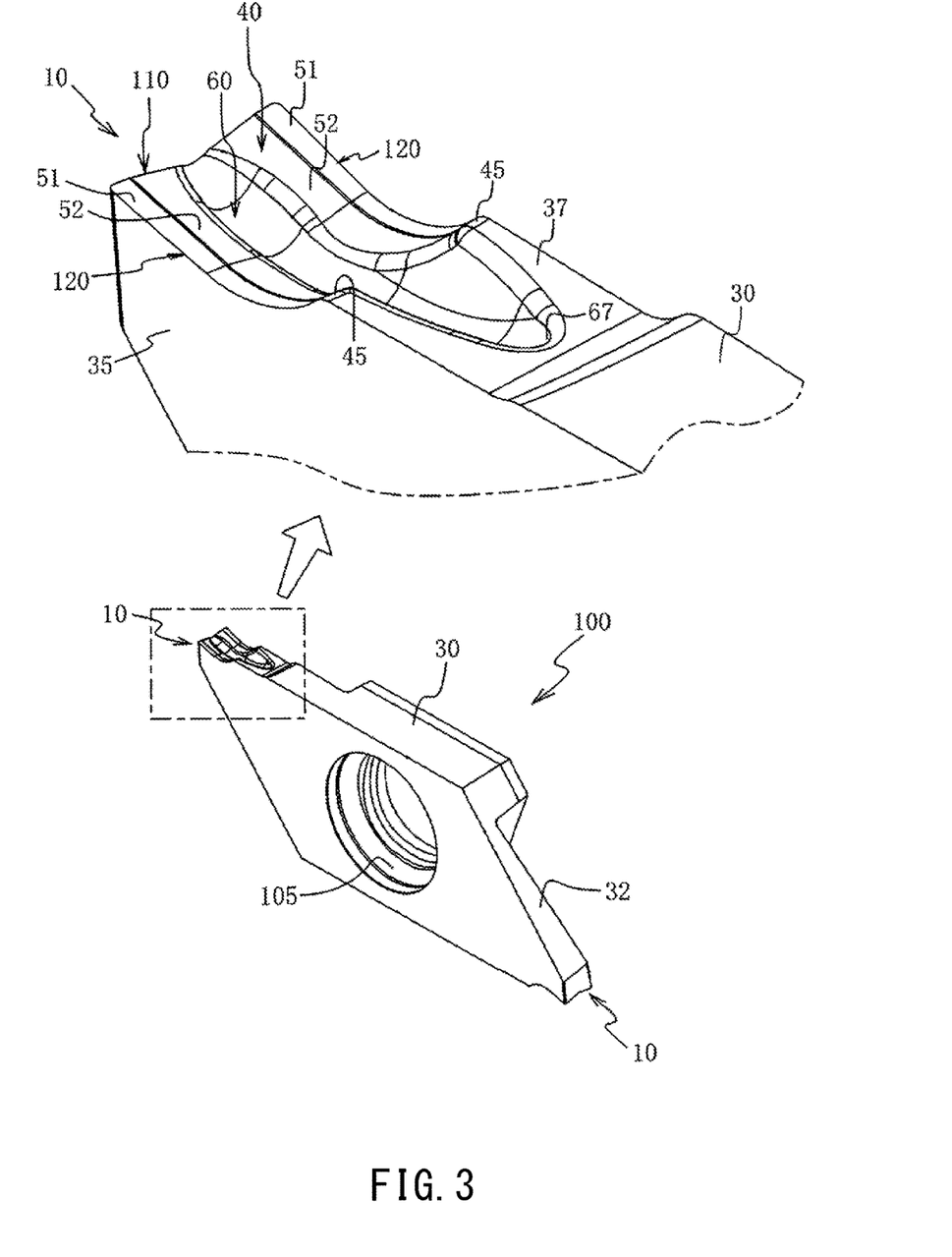
FIG. 3 shows a perspective view of the rake face as viewed from the rear and an enlarged view of an essential part of the perspective view.
Figure 4:
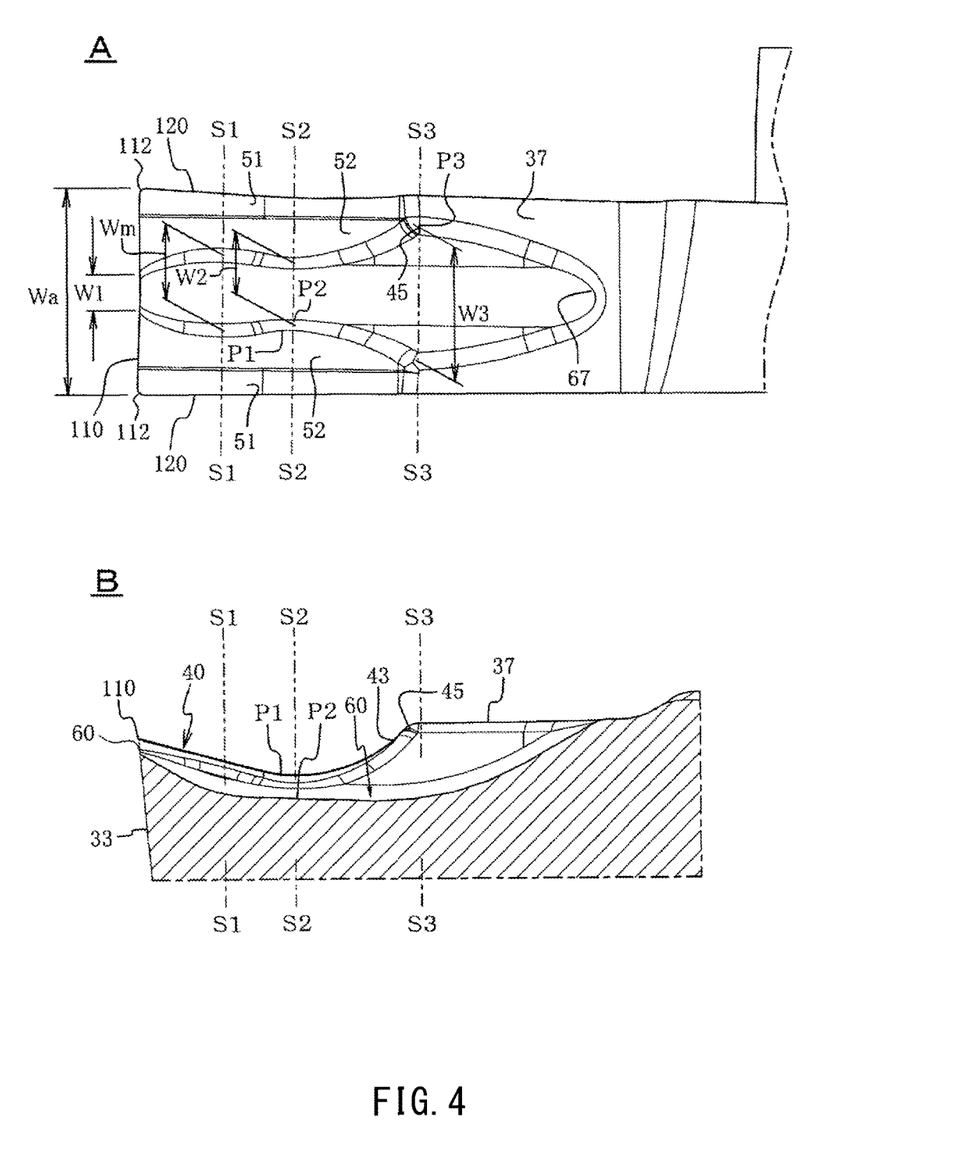
FIG. 4A shows an enlarged plan view of a cutting edge portion as viewed from the rake face side.
FIG. 4B shows a cross-sectional view of the cutting insert taken along a line drawn in FIG. 4A to pass through the center of an end cutting edge and extend rearward so as to be substantially perpendicular to the end cutting edge.

The end cutting edge 110 is straight before a recessed groove described later is formed, and side cutting edges 120 extend rearward from the opposite end of the end cutting edge 110, as viewed from the rake face 40 side (see, for example, FIG. 4). As viewed from the rake face 40 side, the two side cutting edges 120 are formed such that the distance between the side cutting edges 120 is reduced in order to prevent their portions extending rearward from the opposite ends of the end cutting edge 110 from rubbing against machined surfaces during machining such as cutting-off. Specifically, as viewed from the rake face 40 side, the side cutting edges 120 drawn rearward from the opposite ends of the (straight) end cutting edge 110 are back-tapered at an appropriate small angle and are disposed inside two straight lines (not shown) so as to be substantially perpendicular to the rotation axis of an unillustrated workpiece. Each of the side cutting edges 120 forms a ridgeline along which the rake face 40 crosses a side flank face 35 (a surface of a triangular thin-walled portion of the parallelogrammic plate near an acute corner thereof) and is formed such that the side flank face 35 has an appropriate side clearance angle during machining. In the present example, corners 112 of the rake face 40 that are formed by the end cutting edge 110 and the side cutting edges 120 on the rake face 40 are slightly rounded in order to prevent chipping. As viewed from the rake face 40 side, a portion (rectangular portion) surrounded by the end cutting edge 110 and the opposite side cutting edges 120 is substantially laterally symmetric with respect to a straight line (not illustrated) drawn rearward from the center of the end cutting edge 110 so as to pass through a central portion between the opposite side cutting edges 120. As viewed from the front flank face 33 side, the rake face 40 (including inclined surfaces and a recessed groove described later) in its cross section perpendicular to the above straight line has a shape substantially laterally symmetric with respect to a straight line (not illustrated) drawn at the center of the end cutting edge 110 so as to be perpendicular to the end cutting edge 110.

In the present example, the rake face 40 extends rearward from the end cutting edge 110 at a positive rake angle (e.g., 15° with respect to a long side of the parallelogram) and further extends rearward from an appropriate point (a position P1 in FIG. 4) rearward of the end cutting edge 110 (in a forward-rearward direction) while forming an arc-shaped concave curved surface such that the rake angle becomes negative (0° or a negative rake angle). A breaker wall 43 continuous with the curved surface and rising obliquely rearward from the curved surface at an angle of, for example, 45° is provided in the rake face 40. Specifically, in the present example, the rake face 40 includes a positive rake face that is inclined downward from the end cutting edge 110 toward the rear such that a positive rake angle is obtained and further includes the breaker wall 43 rising obliquely rearward from the rear end of the positive rake face (at the position P1 in FIG. 4). Therefore, in the present example, a forward-rearward region extending rearward from the end cutting edge 110 to the position P1 in FIG. 4 forms the positive rake face. The positive rake face is formed so as to extend rearward from the end cutting edge 110 and to have, near the rear end position of the positive rake face (the position P1 in FIG. 4), an arc-shaped concave curved surface in the forward-rearward direction. Part of the curved surface forms the forward end of the breaker wall 43, i.e., its rising base. An upper end 45 of the breaker wall 43 is slightly higher than the level of the end cutting edge 110, is slightly lower than a long side of the parallelogram forming the cutting insert 100, and a substantially flat surface 37 extends rearward from the upper end 45 at an inclination angle of about 3° with respect to the surface 30 extending along the long side.

In a portion of the rake face 40 described above, the portion extending from the end cutting edge 110 along the side cutting edges 120 in the forward-rearward direction, inclined surfaces are formed such that they incline downward from the side cutting edges 120 toward a central portion of the rake face 40 between the side cutting edges 120. Each of the inclined surfaces may have one inclination. However, in the present example, each of the inclined surfaces includes: a first inclined surface 51 inclined downward at a relative small angle α1 (e.g., 5° with respect to the straight end cutting edge 110) from a corresponding one of the side cutting edges 120 toward the central portion between the side cutting edges 120; and a second inclined surface 52 continuous with the first inclined surface and inclined downward at an angle α2 larger than the small angle α1 (e.g., 12° with respect to the straight end cutting edge 110) (see FIG. 5). Each inclined surface including two inclined surfaces, i.e., the first inclined surface 51 and the second inclined surface 52, is formed in a forward-rearward region between the forward end of a corresponding side cutting edge 120 at which the end cutting edge 110 is located and the upper end 45 of the breaker wall 43. The first inclined surface 51 of each inclined surface has a stripe shape extending along a corresponding side cutting edge 120 and has a substantially constant width over the entire forward-rearward region when the side cutting edge 120 is assumed to have no back rake. The width of the first inclined surface 51 of each side cutting edge 120 is set to be ⅒ to ⅕ the cutting edge length of the end cutting edge 110 (the size between the forward ends of the side cutting edges 120).

Figure 5:
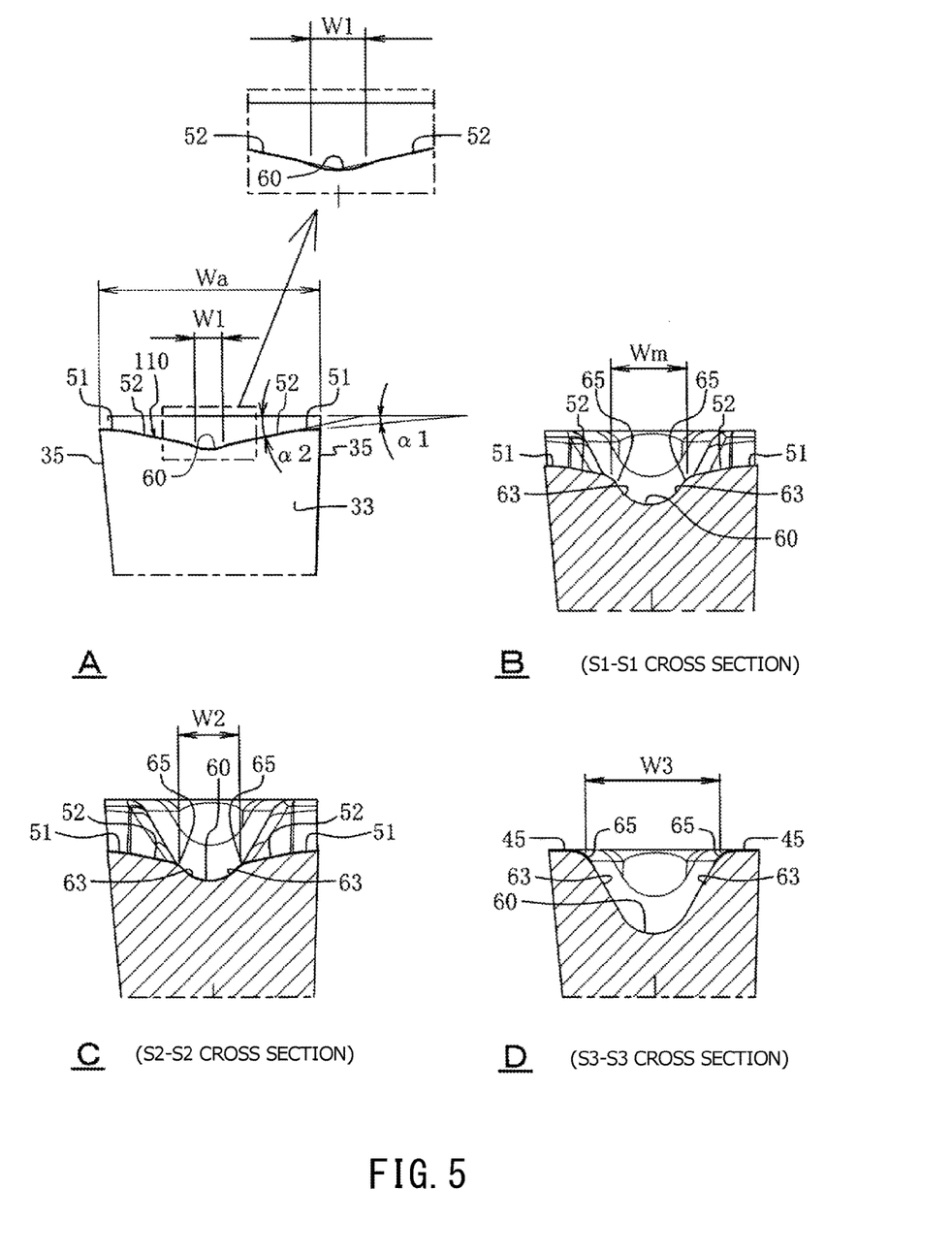
FIG. 5A shows a partial enlarged view of the end cutting edge as viewed from the front flank face side and a further enlarged view of a recessed groove portion at the end cutting edge.
FIG. 5B is a cross-sectional view taken along line S1-S1 in FIG. 4.
FIG. 5C is a cross-sectional view taken along line S2-S2 in FIG. 4.
FIG. 5D is a cross-sectional view taken along line S3-S3 in FIG. 4.

A recessed groove 60 located downward of the inclined surfaces is formed in the central portion of the rake face 40 between the inclined surfaces (the opposite first inclined surfaces 51 and the opposite second inclined surfaces 52). The recessed groove 60 extends rearward from the end cutting edge 110 in the forward-rearward direction beyond the upper end 45 of the breaker wall 43, i.e., extend into the flat surface 37 provided rearward of the upper end 45 of the breaker wall 43. In the present example, the recessed groove 60 has a semi-arc-shaped transverse cross section with a concave groove bottom or a V-groove-shaped transverse cross section having a semi-arc-shaped portion near the groove bottom (see, for example, FIG. 5). The recessed groove 60 is provided such that its groove width varies in the forward-rearward direction as described later. As described above, a front clearance angle is imparted to the end cutting edge 110, and the above-described inclined surfaces are formed on the rake face 40 in the region extending from the end cutting edge 110. Therefore, as viewed from the rake face 40 side, the end cutting edge 110 is not strictly straight. In addition, the recessed groove 60 reaches the end cutting edge 110. Therefore, as viewed from the rake face 40 side, the center of the end cutting edge 110 is slightly concave rearward. However, as shown in FIG. 5A, the recessed groove formed in the central portion between the opposite inclined surfaces has a very small depth at the position of the end cutting edge 110. Therefore, the amount of rearward recession of the end cutting edge 110 is also very small. The depth of the recessed groove will be described later.

The recessed groove 60 is formed in the central portion between the opposite inclined surfaces (the opposite first inclined surfaces 51 and the opposite second inclined surfaces 52) and extends in the forward-rearward direction. Next, the change of the width of the recessed groove 60 in the forward-rearward direction when the recessed groove 60 is viewed from the rake face 40 side will be described (see (FIGS. 4 and 5). The groove width (size) is the width between the opposite groove edges of the recessed groove 60, i.e., the width between ridge portions 65 at which opposite groove walls (groove wall surfaces) 63 and the opposite inclined surfaces (the second inclined surfaces 52 in the present example) cross each other. The ridge portions 65 at the intersections are slightly rounded (slightly chamfered) (with a radius of about 0.1 mm). Specifically, the groove width of the recessed groove 60 extending in the forward-rearward direction and reaching the center of the end cutting edge 110 changes as follows. The groove width of the recessed groove 60 at the end cutting edge 110 is W1. As shown in FIG. 4, the groove width of the recessed groove 60 gradually increases from the end cutting edge 110 toward the rear and then gradually decreases. As a result of the gradual width decrease, the recessed groove 60 has a narrowest portion at a substantially intermediate position P2, with respect to the forward-rearward direction of the rake face 40, between the end cutting edge 110 and the upper end 45 of the breaker wall 43 (the position of the line S2-S2 in FIG. 4). Then the width of the groove formed gradually increases from the position P2, i.e., the narrowest portion, at which the recessed groove 60 has a groove width W2, toward the rear up to a position P3 of the upper end 45 of the breaker wall 43 (the position of the line S3-S3 in FIG. 4). These changes such as the above gradual increase are determined such that each of the ridge line forms a smooth curve, when the recessed groove is viewed from the rake face 40 side. As viewed in the forward-rearward direction of the rake face 40, the position P2 of the narrowest portion is located forward of the position P3 of the upper end 45 of the breaker wall 43 and rearward of the positive rake angle rear end position P1. Therefore, the flowing direction of chips flowing rearward at the positive rake angle along the rake face 40 from the end cutting edge 110 is changed from a downward direction to a horizontal or upward direction at the position P2 of the narrowest portion.

The groove width of the recessed groove 60 at the position of the end cutting edge 110 is denoted by W1, the groove width thereof at the position P2 of the narrowest portion in the forward-rearward direction is denoted by W2, and the groove width thereof at the position P3 of the upper end 45 of the breaker wall 43 is denoted by W3. The recessed groove 60 is formed such that the groove widths W1, W2, and W3 at these positions satisfy the dimensional relation W1<W2<W3. W1 satisfies the dimensional relation W1≤Wa/2, where Wa is the length of the end cutting edge 110 when the end cutting edge 110 is viewed from the rake face 40 side. In the present example, W1 is set to be about ⅕ of Wa. As for the dimensional relation between W1 and W2, W1 is about one half of W2. W2 is set to be about ⅓ of Wa. W3 is set to be about ½ of Wa. The recessed groove 60 extending rearward is formed so as to extend rearward beyond the upper end 45 of the breaker wall 43 into the flat surface 37 provided rearward of the upper end 45. In the flat surface 37, the recessed groove 60 is formed such that the groove width gradually decreases toward the rear end 67 of the recessed groove 60 and finally becomes zero. The groove width of the recessed groove 60 gradually increases from the end cutting edge 110 toward the rear and then starts decreasing at a maximum groove width portion where the recessed groove 60 has a groove width Wm. The groove width Wm is larger than the groove widths W1 and W2 but smaller than W3. The portion with the groove width Wm is an intermediate portion (the position of the line S1-S1 in FIG. 4) in the forward-rearward region between the position at which the recessed groove has the groove width W1 and the position P2 at which the recessed groove has the groove width W2.

The depth of the recessed groove 60 may be constant in the forward-rearward region extending to the breaker wall 43. However, in the present example, the depth changes as follows. Specifically, in the present example, the depth of the recessed groove 60 is defined as the depth of the groove from the side cutting edges 120. As shown in FIGS. 4 and 5, the groove depth gradually increases toward the rear from the position of the end cutting edge 110 at the forward end, becomes maximum (deepest) at an intermediate portion in the forward-rearward region between the position at which the recessed groove has the groove width W1 and the position P2 at which the recessed groove has the groove depth W2, then gradually decreases, becomes minimum near the narrowest portion (the position P2 at which the recessed groove has the groove width W2), and then gradually increases toward the rear up to a position near the position P3 corresponding to the upper end 45 of the breaker wall 43. The level of the bottom of the recessed groove 60 changes as follows. The depth of the recessed groove 60 slightly increases from the position at which the groove has the largest depth (is the deepest), i.e., from the intermediate portion in the forward-rearward region between the position at which the recessed groove has the groove width W1 and the position at which the recessed groove has the groove width W2, toward the rear up to the position corresponding to the position P3 of the upper end 45 of the breaker wall 43, as illustrated (see the cross-sectional view in FIG. 4). Then the depth of the recessed groove 60 gradually decreases from the position corresponding to the position P3 of the upper end 45 of the breaker wall 43 toward the rear. In the present example, the groove depth at the deepest portion and the groove depth at the portion where the recessed groove 60 has the groove width W2 are within the range of ⅕ to ⅔ of the groove widths at these portions.

Figure 6:
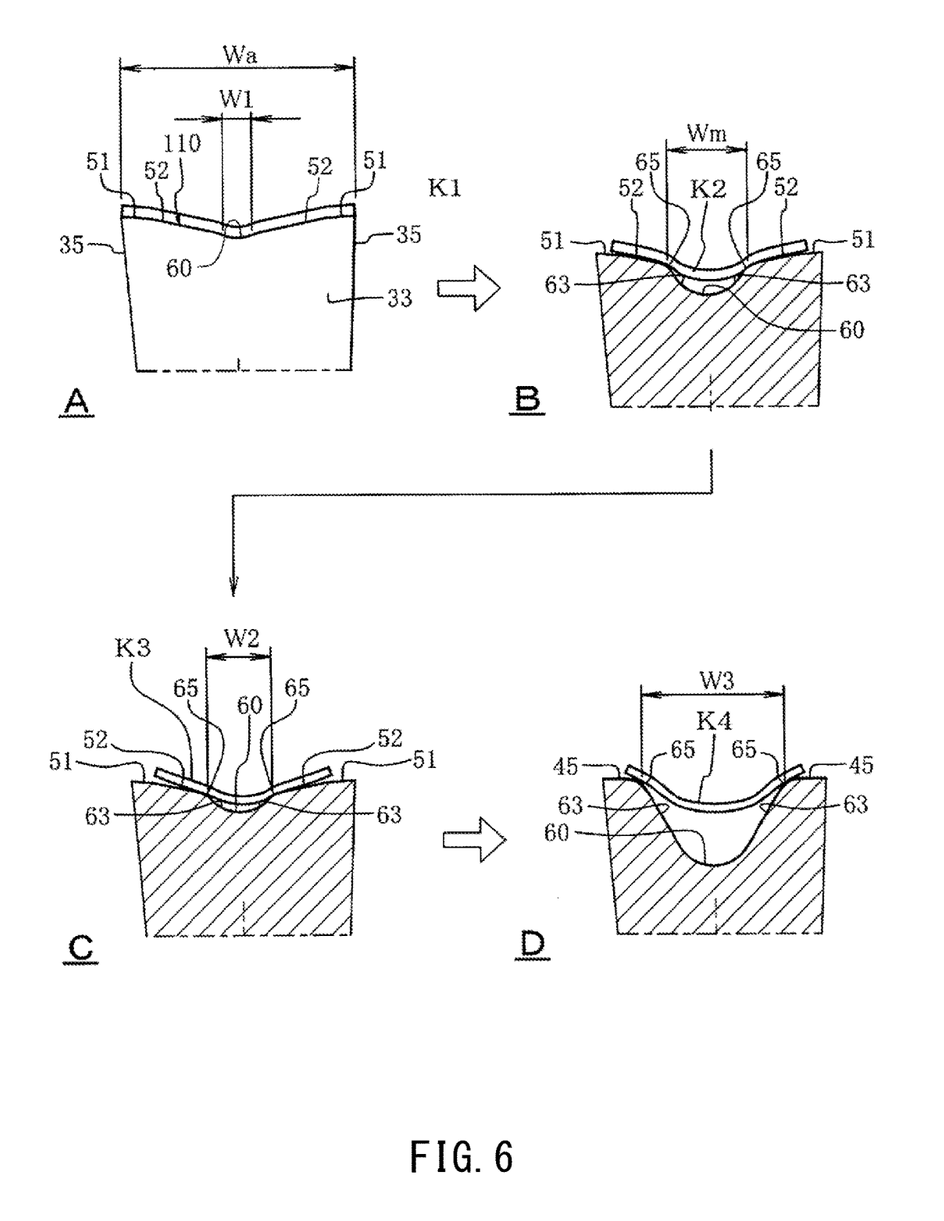
FIG. 6 is a set of views showing how the transverse cross section of a formed chip changes when the chip flows along the rake face, FIG. 6A being a view of the chip formed immediately after cutting by the end cutting edge in FIG. 5A, FIGS. 6B to 6D being cut-end views showing the deformed states of the chip at the cross-sectional positions of FIGS. 5B to 5D.

Chips formed when the cutting insert 100 in the present example is used to perform grooving or cutting-off by turning flow rearward along the recessed groove 60 while being pressed against the rake face 40 and the bottom side of the recessed groove 60 and guided by the recessed groove 60 having a groove width varying as described above. Therefore, the chips are curled into a flat spiral spring shape with no lateral displacement and then discharged, irrespective of the thickness of the chips that varies according to the amount of feed. In this manner, the workpiece is prevented from being scratched, and improvement in the surface roughness of the cut end surfaces is achieved. Referring next to FIG. 6, the flow of chips will be described based on the results of observation by the inventor and also on inferences. Specifically, chips during actual cutting processing and chips discharged as a result of the cutting were observed. The machining conditions in the actual cutting processing are as follows. The workpiece was a round bar formed of SUS304 and having a diameter of 8 mm. The cutting speed was 80 m/min, and the feed rate was within the range of 0.02 to 0.08 mm/rev.

When the cutting insert 100 in the present example is fed toward the workpiece at a prescribed feed rate, a chip K1 having a transverse cross section conforming to the shape of the end cutting edge 110 is formed as shown in FIG. 6A and flows rearward while being pressed against the rake face 40. The chip K1 formed at the start of the cutting has a shape conforming to the shape of the end cutting edge 110, and an intermediate (central) portion of the chip K1 in the widthwise direction has a downward convex shape. The chip K1 flows rearward along the recessed groove 60 while being guided by the recessed groove 60. The width of the as-formed chip may be substantially the same as the width Wa of the end cutting edge 110.

When the thus-formed chip starts flowing rearward along the recessed groove 60, the chip flows rearward while being pressed toward the bottom of the recessed groove 60 so as to sag toward the bottom because the groove width of the recessed groove 60 gradually increases toward the rear. The chip flowing rearward has a downward convex ridge (core) continuously extending in the forward-rearward direction through the portion of the recessed groove 60 at which the groove has the groove width Wm. Therefore, as shown in FIG. 6B, the chip K2 sags into the recessed groove 60 and stably flows rearward through the center of the recessed groove. During the flowing process, the sagging chip undergoes a deformation action such that the opposite sides of the chip are lifted, because of the chip is pressed against the opposite ridge portions 65 (the corners formed by the inclined surfaces and the opposite groove wall surfaces of the recessed groove 60) in a direction toward the groove bottom of the recessed groove 60 and the inclination of the inclined surfaces. As a result of these actions, the width of the chip K2 becomes smaller than the width of the chip K1 at the start of its formation.

When the chip flowing rearward flows thorough a region in which the groove width of the recessed groove 60 gradually decreases, the opposite sides of the chip or its portions near the opposite sides are more strongly pressed against the opposite ridge portions 65 of the recessed groove 60, etc. As a result, the chip undergoes a deformation action such that, in a transverse cross section of the chip, portions of the chip near its opposite ends are further lifted upward (the chip is folded). As a result of this deformation action, the chip is deformed so as to have a transverse cross section in which the widthwise central portion is more convexed downward, and the width is further reduced.

When the chip undergoing the deformation action described above reaches the position of the narrowest portion P2 with the groove width W2, the folding deformation action in the width direction on the chip K3 further increases as shown in FIG. 6-C. This is because, since the narrowest portion (waist portion) P2, which is the portion with the groove width W2, is located rearward of the positive rake angle rear end position Pl, the opposite sides (or portions near the opposite sides) of the chip K3 receive extremely strong pressing forces from the opposite edges (ridge portions) of the recessed groove 60 when the chip K3 passes through the narrowest portion. Since the groove width W2 is set to be larger than the groove width W1 at the end cutting edge 110, the downward convex continuous ridge of the chip formed at the start of the cutting is not disengaged from the recessed groove 60 even in the narrowest portion (waist portion), so that the guiding action on the rearward flow is also maintained.

The chip passing through the narrowest portion flows rearward through the portion of the recessed groove 60 in which its groove width gradually increases toward the upper end 45 of the breaker wall 43 located rearward of the narrowest portion. Also in the flow of the chip, the chip K4 is allowed to sag toward the bottom of the recessed groove 60 and flows rearward while being pressed against the opposite ridge portions 65 of the recessed groove 60. Therefore, the chip K4 flows to the upper end 45 of the breaker wall 43 while being guided by the recessed groove 60 with no lateral displacement (see FIG. 6D). As a result, the chip K4 flowing rearward along the rake face 40 is curled into a flat spiral spring shape with no lateral displacement and cut to an appropriate length. It has been found from the actual cutting results that the flow of chips is not influenced by their thickness. As can be seen from the actual cutting results, even when the feed rate is small and the chips have a small thickness, the chips are disposed of as chips curled into a flat spiral spring shape with no lateral displacement, and the chips discharged do not cause scratches on the machined surfaces, i.e., the groove wall surfaces and the cut end surfaces, and do not wrap around the workpiece. As described above, with the cutting insert 100 configured as described above, the chips formed during grooving and cutting-off can be extremely preferably disposed of.

The present invention is not limited to the above-described embodiment and may be embodied in an appropriately modified form without departing from the scope of the invention. In the above example, the present invention is embodied such that the groove width varies (gradually increases and gradually decreases) so that each of the ridge line forms a smooth curve when the groove is viewed from the rake face side. However, the groove width may gradually increase and gradually decrease such that each of the ridge line forms a plurality of connected straight lines. Each of the groove widths W1, W2, and W3 may be set to any appropriate size according to the length of the rake face in the forward-rearward direction, the length of the end cutting edge, etc., so long as the dimensional relation W1<W2<W3 holds. The position P2 of the narrowest portion (groove width: W2) after the gradual increase in groove width may be set appropriately according to the rake angle of the rake face, the rising state of the breaker wall, the forward-rearward length from the end cutting edge to the upper end of the breaker wall, and the machining conditions such as the amount of feed. The depth of the recessed groove, as well as the inclination angles of the inclined surfaces, has an influence on the deformation of chips in their width direction. The depth of the recessed groove may be appropriately set in relation to the position of the recessed groove in the forward-rearward direction and its groove width so that appropriate deformation is obtained according to the length of the end cutting edge, i.e., the width of the chips and the feed rate (the thickness of the chips) during turning, the machinability of the workpiece, etc. In the above example, the cutting insert embodied has a parallelogrammic shape in which two cutting edges each having a cutting edge are disposed at opposite acute corners. However, it will be appreciated that the present invention can be embodied as cutting inserts with various shapes such as a triangular cutting insert having three cutting edges at its three corners, a so-called dog bone-type cutting insert having a rectangular (oblong) plate shape with cutting edges at its opposite ends, irrespective of the shapes of the cutting inserts (main bodies).

DESCRIPTION OF REFERENCE NUMERALS

40: rake face
43: breaker wall
45: upper end of the breaker wall
51, 52: inclined surface (first inclined surface, second inclined surface)
60: recessed groove
100: cutting insert
112: corner formed by the end cutting edge and a side cutting edge
110: end cutting edge
120: side cutting edge
P1: positive rake angle rear end position (the rear end of the positive rake face)
P2: position of the narrowest portion formed as a result of gradual width decrease rearward of the positive rake angle rear end position
W1: groove width of the recessed groove at the position of the end cutting edge when the recessed groove is viewed from the rake face side
W2: groove width of the recessed groove at the position of the narrowest portion when the recessed groove is viewed from the rake face side
W3: groove width of the recessed groove at the position of the upper end of the breaker wall when the recessed groove is viewed from the rake face side
Wa: length of the end cutting edge when the end cutting edge is viewed from the rake face side

The invention claimed is:

1. A cutting insert having a forward end and a rear end opposite the forward end, the cutting insert comprising:
    an end cutting edge at the forward end of the cutting insert;
    side cutting edges extending from opposite ends of the end cutting edge and toward the rear end of the cutting insert;
    a rake face including
        a positive rake face extending from the end cutting edge and toward the rear end of the cutting insert, the positive rake face terminating at a rear end of the positive rake face, the positive rake face inclined downward from the end cutting edge so that a positive rake angle is obtained,
        a breaker wall rising obliquely from the rear end of the positive rake face or rising obliquely from a position rearward of the rear end of the positive rake face to an upper end; and
        inclined surfaces extending from the end cutting edge along the side cutting edges, the inclined surfaces formed so as to incline downward from the side cutting edges toward a central portion of the rake face between the side cutting edges;
    wherein the rake face defines a recessed groove located downward of the inclined surfaces in the central portion between the inclined surfaces, the recessed groove extending rearward from the end cutting edge toward the rear end of the cutting insert and beyond an upper end of the breaker wall into a portion of the cutting insert rearward of the breaker wall,
    wherein the recessed groove is formed such that, as viewed from a rake face side in a region between the end cutting edge and the upper end of the breaker wall, from a position of the end cutting edge toward the rear end of the cutting insert, a groove width of the recessed groove gradually increases, then gradually decreases such that the recessed groove has a narrowest portion at a position forward of a position of the upper end of the breaker wall and rearward of a positive rake angle rear end position which is the rear end of the positive rake face, and then gradually increases from the position of the narrowest portion until the position of the upper end of the breaker wall, and
    wherein the recessed groove is formed such that, when the groove width at the position of the end cutting edge is denoted by W1, the groove width at the position of the narrowest portion is denoted by W2, and the groove width at the position of the upper end of the breaker wall is denoted by W3, then the groove widths W1, W2, and W3 satisfy a dimensional relation $W1<W2<W3$.

2. The cutting insert according to claim 1, wherein each of the inclined surfaces includes:
    a first inclined surface inclined downward at a small angle $\alpha1$ from a corresponding one of the side cutting edges toward the central portion of the rake face between the side cutting edges; and
    a second inclined surface continuous with the first inclined surface and inclined downward at an angle $\alpha2$ larger than the small angle $\alpha1$.

3. The cutting insert according to claim 1, wherein, where Wa is a length of the end cutting edge when the end cutting edge is viewed from the rake face side, W1 and Wa satisfy a dimensional relation $W1 \leq Wa/2$.

4. The cutting insert according to claim 1, wherein, as viewed from the rake face side, corners formed by the end cutting edge and the side cutting edges are rounded.

5. The cutting insert according to claim 1, wherein the cutting insert is configured for grooving or cutting-off.

* * * * *